(12) United States Patent
Krumholz

(10) Patent No.: US 6,997,591 B2
(45) Date of Patent: Feb. 14, 2006

(54) SYNCHRONIZED FLASHING LIGHTING DEVICE

(75) Inventor: Spencer Krumholz, Boca Raton, FL (US)

(73) Assignee: World Imports International, Inc., Pompano Beach, FL (US)

( * ) Notice: Subject to any disclaimer, the term of this patent is extended or adjusted under 35 U.S.C. 154(b) by 148 days.

(21) Appl. No.: 10/390,554

(22) Filed: Mar. 17, 2003

(65) Prior Publication Data

US 2004/0184266 A1    Sep. 23, 2004

(51) Int. Cl.
*F21S 4/00*     (2006.01)
(52) U.S. Cl. ............. 362/543; 362/495; 362/493; 362/340; 362/800
(58) Field of Classification Search .......... 340/815.45; 362/495, 240, 545, 540, 542, 800, 493, 340, 362/543; 385/133; 307/115
See application file for complete search history.

(56) References Cited

U.S. PATENT DOCUMENTS

| | | | | |
|---|---|---|---|---|
| RE33,504 E | * | 12/1990 | Yuhasz et al. | 307/115 |
| 5,931,573 A | * | 8/1999 | Knox | 362/493 |
| 6,158,882 A | * | 12/2000 | Bischoff, Jr. | 362/488 |
| 6,404,409 B1 | * | 6/2002 | Solomon | 345/31 |
| 6,472,823 B1 | * | 10/2002 | Yen | 315/112 |
| 6,484,456 B1 | * | 11/2002 | Featherstone et al. | 52/118 |
| 6,623,151 B1 | * | 9/2003 | Pederson | 362/542 |
| 6,700,502 B1 | * | 3/2004 | Pederson | 340/815.45 |
| 6,717,376 B1 | * | 4/2004 | Lys et al. | 315/292 |
| 6,788,217 B1 | * | 9/2004 | Pederson | 340/815.45 |
| 6,822,578 B1 | * | 11/2004 | Pederson | 340/815.45 |
| 2002/0159741 A1 | * | 10/2002 | Graves et al. | 385/133 |

* cited by examiner

*Primary Examiner*—Sandra O'Shea
*Assistant Examiner*—Anabel Ton
(74) *Attorney, Agent, or Firm*—Myron Greenspan, Esq.; Lackenbach Siegel, LLP

(57) ABSTRACT

A flashing lighting device, most specifically designed for mounting inside and outside an automobile, is comprised of a housing and, within in, a circuit for storing at least one flashing sequence signal. At least one first array of light-emitting elements is close to this housing and generates a flashing pattern responsive to the flashing sequence signal, and at least one second array of light-emitting elements are arranged more remotely from the housing than the at least one first array and is also responsive to said flashing signal. In this way the circuit actuates said the two arrays or series of arrays in a way substantially contemporaneous with the same flashing pattern so that observation of any one array conveys information regarding the flashing pattern displayed in the other array.

22 Claims, 4 Drawing Sheets

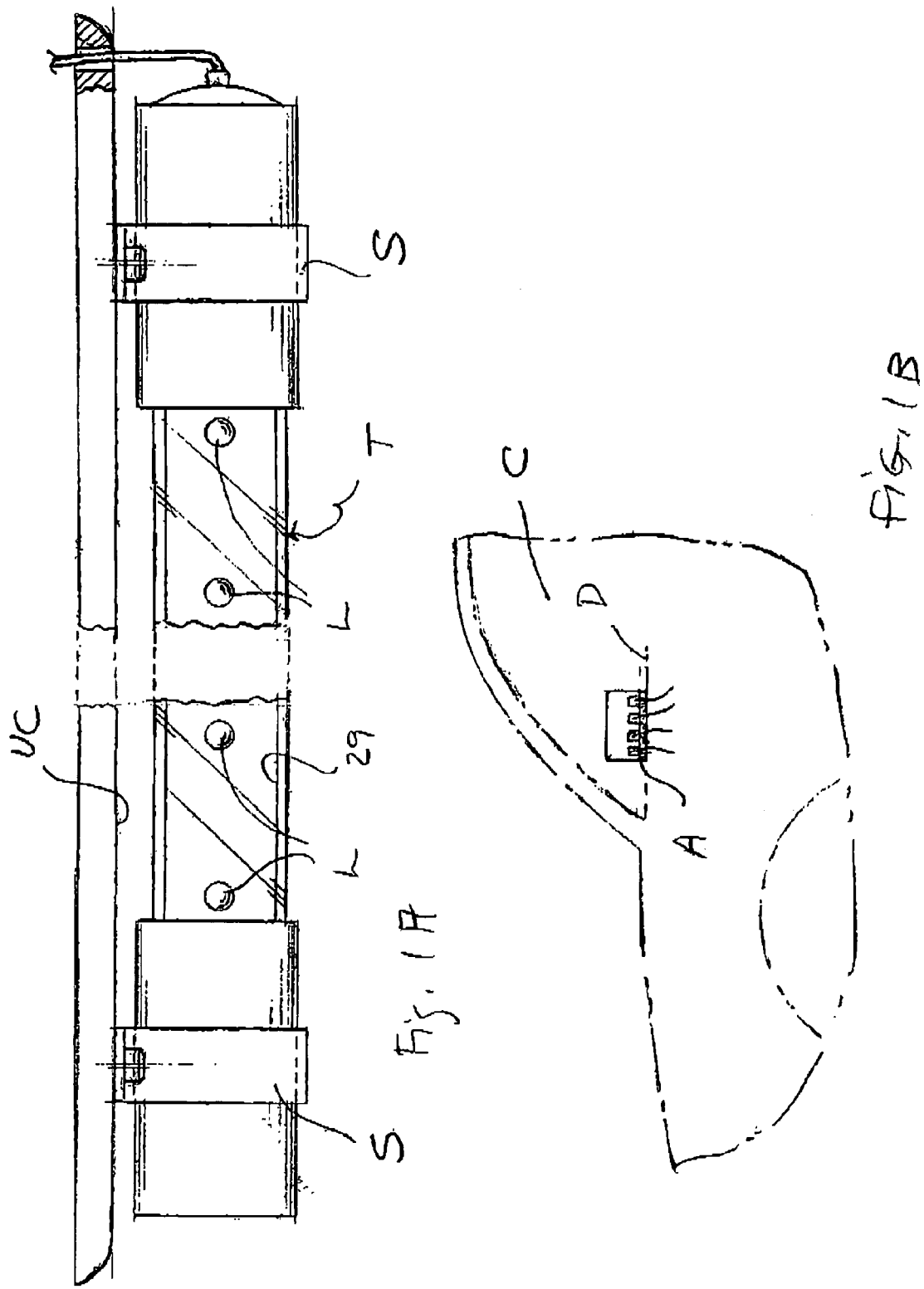

SYNCHRONIZED FLASHING LIGHTING DEVICE

BACKGROUND OF THE INVENTION

1. Field of the Invention

This invention generally relates to decorative automotive lighting devices and, more specifically, to a synchronized flashing lighting device.

2. Background of the Invention

It has become popular, particular with young adults, to decorate their automobiles in various ways, including applying decorative trim, attaching fluorescent or phosphorescent materials to surfaces both on the inside passenger compartment as well as on the exterior chassis or body of the automobile, and attaching numerous types of lighting accessories that illuminate, accent and cause various parts of the automobile to flash. Some of the lighting accessory are physically and/or electrically connected to a functional component of the automobile to cause the lighting device to be activated or energized in response to certain functional conditions. Thus, some lighting devices are actuated when the turn signal is activated, when a brake is depressed, in response to radio music or audio amplitude and/or frequency, etc.

Some lighting devices are standalone units that include a control circuit within the passenger compartment that can be operated by the passenger in the vehicle. Such devices typically include an array of lighting elements, such as LEDs, and a circuit within the housing that stores at least one flashing pattern. When turned on, the control circuit issues a flashing signal that is applied to the lighting elements, causing these to flash in a predetermined or random pattern or sequence. The lighting elements can be mounted in an array in any desired manner, such as in an elongate transparent protective tube that is itself mounted on the interior or the exterior of the vehicle. Typically, the lighting elements are mounted so that these are visible by those that are outside of the vehicle. Such lighting devices are intended to decorate or "dress up" the vehicle.

Lighting devices for the undercarriage of an automobile date back at least to 1921. Thus, U.S. Pat. No. 1,395,039 to Chmurski discloses an automobile lighting device that utilizes an incandescent lamp 17. A simple on-off switch is used to energize the lamp 17. This patent is of general interest and does not disclose the features of the present invention.

The use of LEDs in connection with vehicle lamps are also known, as in U.S. Pat. No. 5,038,255 to Nishihashi et al. However, this patent only discloses a signal lamp, such as a stop lamp, to be mounted on motor vehicles. A safety light to be mounted on vehicles is also disclosed in U.S. Pat. No. 5,797,672 to Dobert. A light source arrangement is disclosed in U.S. Pat. No. 5,924,785 to Zhang et al. that also utilizes LEDs. U.S. Pat. No. 5,816,681 relates to a light source that may be used for vehicle style. The disclosed lighting assembly includes an optical diffuser to provide enhanced styling.

A neon illumination apparatus is disclosed in U.S. Pat. No. 5,546,290 to Gonzalez et al. for illuminating a vehicle or other items or areas with a bright glowing light. However, because elongate neon tubes are used the disclosed device cannot provide flashing patterns of the type contemplated by the subject invention, since the entire length of the neon lamp must either be on or off at any given time.

U.S. Pat. No. 6,392,559, issued to Shapre, Jr., discloses an underbody device and adjacent lighting for automobile vehicles. The disclosed lighting system has a remotely controlled lamp or set of lamps mounted on the underside of the vehicle for providing illumination both before the vehicle and under the vehicle. When the vehicle is stationary, the lamps illuminate upon receipt of a predetermined signal from the transmitter. The lamps may also illuminate upon opening a vehicle door to illuminate the path of an exiting passenger. However, the disclosed invention relates more to security lights for illuminating an area adjacent to the vehicle and not so much for decorative purposes. The patent does not disclose or teach the use of an array of elongate arrangements of LEDs that can be energized in predetermined or desired flashing patterns or sequences that can also be viewed within the passenger compartment, preferably contemporaneously.

The present invention displays elongate tubes containing sequential arrangements of LEDs that can be individually activated to provide desired flashing patterns, and these patterns can be selected from the inside of the vehicle compartment. Additionally, the present invention combines the LED tubes with an internal controller that itself provides a display, exhibiting an associated flashing pattern produced or created on the outside of the vehicle.

However, clearly, undercarriage lights are, as a rule, not visible by the driver or by passengers within the vehicle. Therefore, although the lights are visible from the outside, in the prior art people within the automobile cannot see the specific lighting or flashing pattern that is being displayed on the outside. When the control device stores more that one flashing pattern in the prior art, there is normally no way for those within the automobile to know which flashing pattern is being displayed.

SUMMARY OF THE INVENTION

Accordingly, it is an object of the invention to provide a lighting device for automobiles that does not have the disadvantages inherent in such prior art devices.

It is another object of the invention to provide a lighting device that is simply in construction and economical to manufacture.

It is still another object of the invention to provide a lighting device of the type under discussion that provide dual arrays that coordinated in their flashing patterns so that a driver or passengers in a vehicle see and know the specific flashing pattern being displayed on the lighting arrays that are mounted exteriorly, such as the undercarriage, of the vehicle.

It is yet another object of the invention to provide a synchronous flashing lighting device in which two lighting arrays are provided, one within the vehicle visible to the driver and passengers and another array on the undercarriage of a vehicle, these two being synchronized so that the lighting or flashing patterns on both are simultaneously displayed in the same way so that those inside and outside of the vehicle contemporaneously see the same-lighting or flashing patterns.

In order to achieve the above objects, as well as others that will become apparent hereinafter, a flashing lighting device in accordance with the present invention includes a housing and circuit means within said housing for storing at least one flashing sequence signal. At least first array of light-emitting elements is provided in close proximity of said housing for generating a flashing pattern responsive to said flashing sequence signal. At least one second array of light-emitting elements are arranged more remotely from said housing than said at least one first array of light-emitting, and are responsive to said flashing signal. In this manner, said circuit means actuates said arrays substantially contemporaneously with the same flashing pattern so that observation of an entire array conveys information as to the flashing pattern displayed on the other array.

Other features and enhancements to the invention will be evident from the following description.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which:

FIG. 1A is a front elevational view of the undercarriage of the vehicle, showing the manner in which a transparent tube containing an array of LEDs may be mounted to the bottom of the undercarriage;

FIG. 1B diagrammatically illustrates how the control unit of the invention may be mounted within the passenger compartment of a motor vehicle;

DESCRIPTION OF THE PREFERRED EMBODIMENTS

Figure 1:
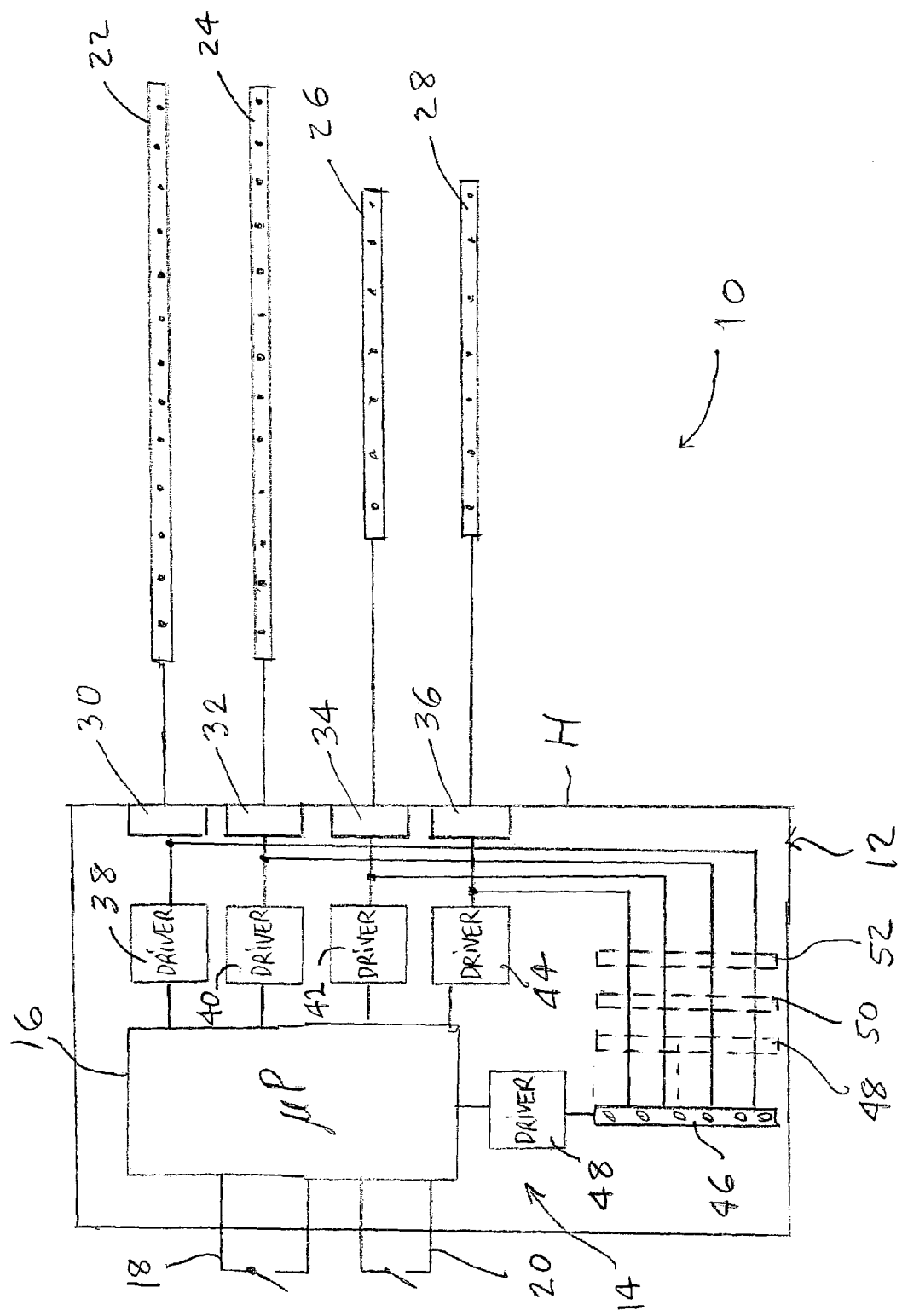
FIG. 1 is a schematic block diagram of a synchronous flashing lighting device in accordance with the invention, illustrating four separate arrays for mounting, for example, on the exterior and particularly on the undercarriage of a vehicle and a single array within the control unit of the device.

Referring now specifically to the drawings, in which identical or similar parts will be designated by the same reference numerals throughout, and first referring to FIG. 1, the synchronous flashing lighting device in accordance with the present invention is generally designated by the reference numeral 10.

The device 10 includes a control unit 12 that includes a housing H and a circuit 14 that includes a microprocessor 16 suitably programmed and including an memory (not shown) for storing at least one flashing pattern or sequence. Two externally mounted switches, 18 and 20, are provided on the housing 12. The switch 18 may be a single pole two-position toggle switch, for example, that represents the ON/OFF positions for the unit, while the other switch 20 may be a single pole temporary open or closed switch that can be manually depressed by a user to select or change a flashing pattern or sequence from the plurality that are stored.

The circuit 14 may be powered by the use of batteries (not shown) within the housing 12 or, more typically, hard wired or by means of a cigarette lighter adapter to the 12-volt power system in the automobile. A suitable and well-known voltage conversion circuit (not shown) may be used to convert the 12-volts available in the automobile to a lower voltage, such as 3- or 5-volts, more typically used with lower voltage devices such as the microprocessor 16.

A plurality of light-emitting element arrays 22, 24, 26 and 28 are connected to the control device 12. Although four such light-emitting arrays are shown, it will be clear that any number of such arrays may be used, including a single array, to as many arrays as are desired and can be supported by the control device 12. Referring to FIG. 1A, each lighting array 22, 24, 26, 28 is, in accordance with the presently preferred embodiment, in the form of elongate transparent hollow tubes T in which elongate printed circuit boards (PCBs) 29 are inserted. Typically, the PCBs extend substantially the full length of the transparent tubes T, and light-emitting elements, such as LEDs L, are mounted on the printed circuit boards in any desired pattern. The light-emitting elements in FIG. 1 are shown to be arranged in a linear pattern although, clearly, the arrays may take on any shape, such as circular, triangular, etc.

The arrays 22, 24, 26, 28 are shown in two pairs of different lengths, the two longer tubes 22, 24 being intended to be mounted on the undercarriage UC on each longer side of the vehicle, while the two shorter tubes or arrays 26, 28 are intended to be mounted on the shorter, front and rear, dies of the vehicle, so that all four of these arrays, suitably arranged, can define a substantially rectangular array, substantially simulating the footprint of the undercarriage. The arrays may be electrically connected to the microprocessor by means of connectors 30, 32, 34 and 36. If the light-emitting elements contained within the arrays 22, 24, 26, and 28 require more power or current than the microprocessor 16 can supply, drivers 38, 40, 42 and 44 may be provided to boost the power or current levels needed to drive the light-emitting elements.

The control unit 12 also includes an auxiliary light-emitting array 46 that is mounted within the housing H and, likewise, may be connected to the microprocessor 16 by means of a driver 48. The housing H, or at least a portion thereof, is made of transparent or translucent material so that the light-emitting array can be seen from outside the housing at least when the array is energized. The output of each driver 38, 40, 42, 44 is shown also connected to the LED array 46, the PCB within the array 46 being designed to energize one or more of the LEDs whenever one of the tubes 22, 24, 26, 28 is energized. The flashing patterns, therefore, of the array 46 is related or corresponds in some fashion to the sequence of activation of the tubes 22, 24, 26, 28.

The configuration or shape of the internal light-emitting array 46 may correspond to the configuration of the external light-emitting arrays 22, 24, 26 and 28 so that application of a predetermined flashing pattern or sequence applied to one of the arrays will have a similar appearance or impact as with the other arrays. While only a single internal light-emitting array 46 is shown, it should also be evident that more than one array can be provided within the housing, limited only by the size of the housing and the capacity of the circuit 14. Thus, for example, additional possible arrays 48, 50 and 52 are shown in dashed outline. If desired, for example, four light-emitting arrays can therefore be contained within the housing H, each of which corresponds or mimics one of the exterior light-emitting arrays 22, 24, 26 and 28. In this way, if four different light-emitting patterns are applied, one to each of the light-emitting arrays, four different flashing patterns can be implemented substantially contemporaneously on each pair of associated light-emitting arrays.

While the external light-emitting arrays 22, 24, 26 and 28 are shown to be connected to the microprocessor essentially in a parallel configuration, so that the same or different flashing patterns or sequences can be independently applied to each light-emitting array, it should also be clear that the light-emitting arrays can be connected in other combinations, such as in series with each other, to effectively produce one or more larger or longer arrays that can be activated or energized by a single output of the microprocessor and a single driver through a single connector. It will be clear, therefore, that the number of light-emitting arrays and the various combinations in which they may be used and activated can be substantial, and it would be well within the knowledge of those skilled in the art to implement any desired combination.

It will be evident that in place of the momentary contact switch 20, used in conjunction with programming of the microprocessor 16, to sequence the stored flashing patterns in the memory . . . several approaches may be used. As will be more fully described in connecting with FIG. 3, the momentary contact switch 20 is used together with a software implementation for the sequencing of patterns. However, selection of a given flashing pattern may also be implemented with a hardware or a combination of hardware and software. For example, if five different or distinct flashing patterns are stored, five separate momentary contact switches may be used to select the desired flashing pattern. Alternately, a multi-position rotary switch may be used or a plurality of rotary switches may be ganged to each other to increase the number of sequences that can be accessed. While some of the hardware implementations may provide the advantage that a user may directly select a desired flashing pattern without the need to sequence through other flashing patterns before reaching the desired pattern, hardware implementations are generally more costly and the embodiment illustrated is generally preferred for its simplicity and lower manufacturing costs.

Figure 2:
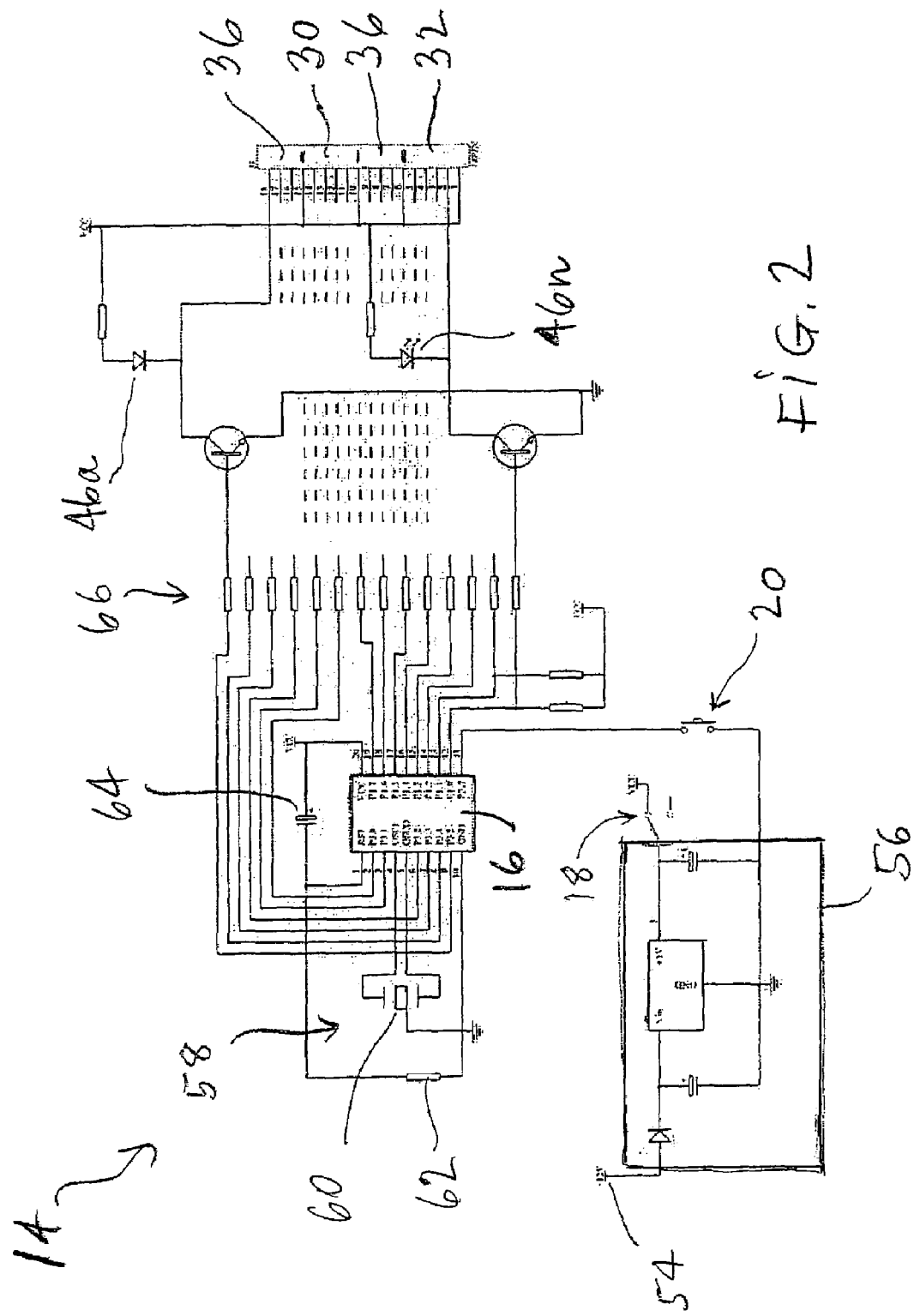
FIG. 2 is an electric schematic diagram of a presently preferred embodiment of the synchronous flashing device in accordance with the invention.

In FIG. 2, a circuit diagram is shown of a circuit can implement the present invention and, generally, corresponds to the block diagram shown in FIG. 1.

The terminal 54 represents the automobile's 12-volt supply, generally a connection to the car's battery. The reference numeral 56 generally designates a voltage converter or regular that reduces the 12 volts available in the car to a lower voltage required by the microprocessor 16 and associated circuitry. As suggested, the voltage is typically reduced to 3 volts or 5 volts, depending on the semiconductors used in the circuit. The specific construction of the voltage conversion device 56 is not critical and these are well known to those skilled in the art and are available as off-the-shelf items. The switch 18 is shown connected to the output of the voltage conversion device 56, being a single pole double throw switch that can be placed in the OFF position to thereby remove the output voltage from the unit 56 or in the ON position when the lower output voltage is applied to the circuit 14. The microprocessor 16 is connected to a clock circuit that consists of a crystal 60, a resistor 62 and a capacitor 64 connected to the appropriate pins or terminals of the microprocessor 64, forming an oscillating or switching circuit that provides clock pulses to the microprocessor 16 for accurately timing its operations. The selection of the specific components is not critical, and these components are well known to those skilled in the art for any given microprocessor. Typically, the manufacturers of the microprocessors themselves specify the nature and the values of the components required for the clock circuit.

A plurality of output terminals of the microprocessor 16 are connected to the drivers shown in the form of transistor Q, one driver being provided for each array or each group of lighting elements that are intended to all be lit simultaneously. The outputs of the driving circuits are directed to the connectors 30, 32, 34 and 36. However, it will be noted that the output of each driver transistor Q also has an additional circuit in the form of a series connected resistor R and light-emitting diode or LED 46a–46n connected between the voltage supply and the collector of a driver transistor. It will be evident that whenever a driver transistor is activated, its collector voltage drops substantially below the nominal voltage supply Vcc and a current flows through the associated resistor R and light-emitting diode. In the embodiment shown, therefore, each diode within the housing H is energized when an associated element 22, 24, 26 or 28 is energized. With this arrangement, only as many diodes need to be used within the housing H as are light-emitting arrays on the outside. Thus, if each elongate tube 22. 24, 26 or 28 includes more than one group of diodes (e.g., a separate linear array of red diodes, a separate array of blue diodes and a separate array of yellow diodes), there would be three diodes within the housing H associated with each of these exterior arrays or groupings of diodes that are actuated in unison. Thus, if there is a total of n groups of diodes, each of which can be energized independently and simultaneously, regardless of how many individuals diodes there are in that group, there would be a corresponding number n of diodes within the housing H representative of each of the outside groups.

As suggested in FIG. 1, the interior diodes 46a–46n need not be electrically tied to the same drivers that energize the exterior arrays. With a sufficiently large processor, separate outputs can be provided for driving independent drivers for driving so that the exterior arrays and the interior array or arrays have their own separate or independent drivers. This may be important if each of the individual groups or arrays of diodes contain so many individual LEDs or other light-emitting elements that a single driver becomes impracticable because of energy and heat considerations. Of course, with such an arrangement as suggested in FIG. 1, the capabilities may be greater, but so are the costs of manufacturing. The circuit shown in FIG. 2 minimizes the cost as the number of drivers as well as the number of internal LEDs are both minimized.

Figure 3:
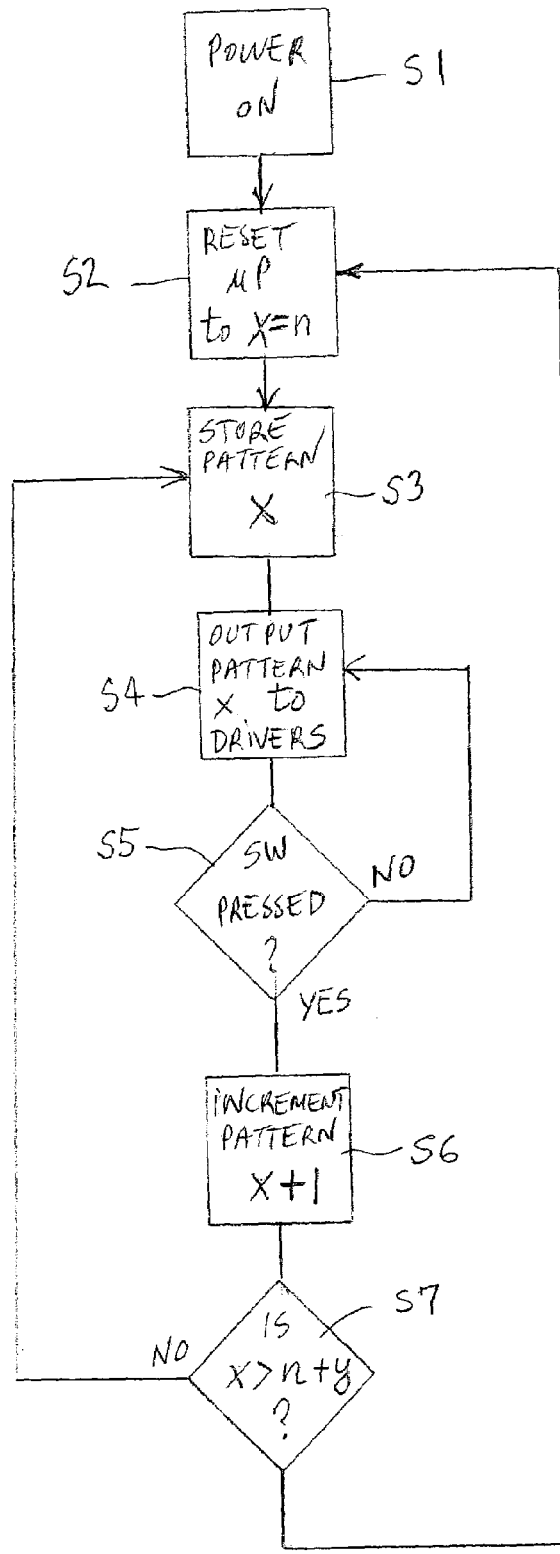
FIG. 3 is a flow chart that depicts an example of how the microprocessor in FIG. 2 can be programmed to sequence flashing patterns of a plurality of such flashing patterns stored in the unit when a user actuates the momentary contacts which are shown in FIG. 2.

Referring to FIG. 3, a flow chart illustrates one software implementation for sequentially stepping through a plurality of different predetermined flashing patterns stored in the circuit 14.

When the power is initially turned on, at S1, the microprocessor is re-set, at S2, to automatically establish the selected flashing pattern to a pattern "n" which becomes a default flashing pattern whenever the unit is turned on. Thus, the selected flashing pattern number "x" is made equal to "n".

At S3, the flashing pattern x is stored, and, at S4, the microprocessor is programmed to output the selected flashing pattern x to the various drivers. Whenever the sequencing switch 18 is pressed by a user, at S5, the software determines that, as it is always inquiring as to whether the switch is being pressed. If it determines that the switch has not be pressed, the processor reverts to step S4 and continues to output the selected pattern x to the drivers. However, if on polling, the processor detects that the switch 18 has been pressed, at S6 the processor adds an increment of 1 to the number of the flashing pattern so that the processor selects the next flashing pattern from its memory. The processor then tries to establish whether the new and selected flashing pattern number 1 is greater than (n+y), where (n+y) is the maximum number of flashing patterns stored in memory. If the current flashing pattern after the unit is incremented at S6 is greater than (n+y), the processor reverts to step S2, and resets the microprocessor to reinitiate the cycle by setting the selected flashing pattern number x to be equal to the default number n. If the current pattern number is not greater than (n+y), the processor stores the new or incremented pattern number x at S3 and now outputs the new flashing pattern to the drivers at S4. As will be seen, by simply providing a momentary contact switch 18, the microprocessor 16 can be easily programmed to step through a sequence of programmed flashing patterns until the desired pattern is selected. Once the switch 18 ceases to be pressed, the unit will continue to output the selected flashing pattern to the drivers and, therefore, to the LEDs, both in the external arrays as well as in the array internal to the housing H.

To install the present invention on an automobile, the light-emitting arrays or tubes 22, 24, 26 and 28 are physically secured to the desired locations on the undercarriage UC of the vehicle (FIG. 1A), making sure that they are free of moving parts and extreme heat sources. Any known means may be used, such as clamps or straps S. The electrical wires leading to the tubes need to be attached to the vehicle so that they do not hang or dangle. Clips or zip cable ties may be used for this purpose. The wires in each tube are run underneath the vehicle to a location where they can enter the inside compartment C of the vehicle. As suggested in FIG. 1B, the housing or control box H can be mounted in a desired location within the vehicle (e.g., on the dashboard D by any suitable or known means such as adhesive A), and plug the wires from the tubes into the connectors 30, 32, 34 and 36. The positive lead from the control box needs to be connected to the battery of the vehicle, with a ground or negative wire from the control box being connected to any suitable ground potential point on the vehicle. The body or chassis of the vehicle or the negative terminal of the battery may be used for this purpose. The unit is not ready to be operated by pressing the ON/OFF switch 18 on the control box or housing.

The various flashing patterns may sequenced, as aforementioned, by repeatedly pressing the switch 20.

As will be evident from the foregoing description, the present invention enables the driver and the passengers within a vehicle to also experience and enjoy the flashing patterns that are displayed outside the vehicle and that they would not normally see. Also, by being able to see the flashing activity within the vehicle, those within the vehicle can also feel assured that the unit is operating properly and that the flashing patterns are being displayed on the outside of the vehicle.

While this invention has been described in detail with particular reference to preferred embodiments thereof, it will be understood that variations and modifications will be effected within the spirit and scope of the invention as described herein and as defined in the appended claims.

What is claimed is:

1. A lighting device for a vehicle having a passenger compartment, the lighting device comprising a housing for use within the passenger compartment; circuit means within said housing for generating a first signal representing at least one lighting pattern; first light-emitting elements forming at least one array of LEDs remote from said housing for mounting on the vehicle outside the passenger compartment and for generating a lighting pattern responsive to said first signal; at least one second light-emitting element arranged on said housing within the passenger compartment and responsive to a second signal representative of said first signal, whereby said circuit means actuates said first and second light-emitting elements substantially contemporaneously with an associated pattern so that observation of said at least one second light-emitting element conveys related information on the pattern displayed by said first light-emitting elements.

2. A device as define in claim 1, further comprising means for mounting said housing within the passenger compartment of an automobile.

3. A device as define in claim 2, wherein said circuit means is connected to the power source of the automobile.

4. A device as define in claim 1, wherein said at least one of first array comprises at least one LED.

5. A device as defined in claim 4, wherein said at least one LED is mounted within said housing.

6. A device as defined in claim 1, wherein said at least one first array of LEDs comprises a substantially linear row of LEDs.

7. A device as defined in claim 6, wherein said LEDs are series connected.

8. A device as defined in claim 1, wherein said at least one first array of LEDs comprises a plurality of substantially linear rows of LEDs.

9. A device as defined in claim 2, wherein said at least one second light emitting element comprises an array of LEDs.

10. A device as defined in claim 6, wherein said LEDs are mounted within a transparent tube so that said LEDs are visible through said tube.

11. A device as defined in claim 10, wherein a plurality of LED-containing tubes are provided.

12. A device as defined in claim 11, wherein four tubes are provided, and further comprising mounting means for mounting said tubes on the undercarriage of an automobile.

13. A device as defined in claim 12, wherein two longer and two shorter tubes are provided, said longer tubes being mountable along the longer sides of a automobile and said shorter tubes being mounted at the shorter front and rear ends of the automobile.

14. A device as defined in claim 1, wherein said circuit means stores a plurality of patterns, and switching means for selecting one of said plurality of patterns.

15. A device as defined in claim 14, wherein said switching means sequentially sequences through said plurality of patterns with each actuation of said switching means.

16. A device as defined in claim 14, wherein said switching means comprises switch.

17. A device as defined in claim 1, wherein said circuit means includes driving means for driving said light-emitting elements.

18. A device as defined in claim 1, wherein said circuit means comprises a programmed microprocessor for generating said signal and driving said light-emitting elements.

19. A device as defined in claim 18, further comprising a momentary contact switch connected to said microprocessor programmed to sequence to a next pattern when it detects a change in state in said momentary contact switch.

20. A device as defined in claim 19, wherein said microprocessor is programmed to store (n+y) patterns And to revert to pattern (n) after the circuit means is sequenced beyond pattern number (n+y).

21. A device as defined in claim 1, wherein said at least one of said arrays includes multi-colored LEDs.

22. A lighting device for a vehicle having a passenger compartment, the device comprising a housing; first mounting means for mounting said housing within the passenger compartment; circuit means within said housing for generating a first signal representing at least one lighting pattern and a second signal representative of said first signal; first light-emitting elements forming at least one array of light-emitting elements remote from said housing; mounting means for mounting said first light emitting elements exteriorly of the passenger compartment for generating a lighting pattern responsive to said first signal that is not normally visible to passenger within the passenger compartment; at least one second light-emitting elements for placement within the passenger compartment and visible to passengers within the passenger compartment and responsive to said second signal; electrical wires connecting said light-emitting elements to said housing; and switch means on said housing for controlling the operation of said circuit means, whereby a passenger within the passenger compartment can view said at least second light emitting element as an indication of said at least one lighting pattern on said at least one array light emitting elements.

* * * * *